United States Patent [19]

Perry

[11] 4,199,283

[45] Apr. 22, 1980

[54] DRILL JIG

[76] Inventor: LaRelle T. Perry, 171B Crescent St., Shrewsbury, Mass. 01545

[21] Appl. No.: 945,202

[22] Filed: Sep. 25, 1978

[51] Int. Cl.[2] .............................................. B23B 49/00

[52] U.S. Cl. ............................................... 408/115 R

[58] Field of Search ................... 408/115, 112, 97, 89, 408/90, 241, 72; 144/93 R; 33/174 R, 201

[56] References Cited

U.S. PATENT DOCUMENTS

| | | | |
|---|---|---|---|
| 2,471,940 | 5/1949 | Dion | 408/89 |
| 2,948,168 | 8/1960 | McCormick | 144/93 R X |
| 2,991,668 | 7/1961 | Keller | 408/89 X |
| 3,086,408 | 4/1963 | Donals | 408/115 |
| 3,248,101 | 4/1966 | Müller et al. | 408/89 X |
| 3,263,531 | 8/1966 | Sammons et al. | 144/93 R |
| 3,465,620 | 9/1969 | Hilburn | 408/115 |
| 3,534,639 | 10/1970 | Treichler | 408/115 X |
| 3,804,546 | 4/1974 | Boyajian | 408/115 |
| 3,977,805 | 8/1976 | Wanous | 408/115 B |

FOREIGN PATENT DOCUMENTS 2614107 10/1977 Fed. Rep. of Germany ........... 408/241

*Primary Examiner*—William R. Briggs

*Attorney, Agent, or Firm*—Charles Hieken

[57] ABSTRACT

A drill jig is arranged to provide a guide for a drill bit to bore a hole having its major axis aligned at any desired angle relative to a work surface.

6 Claims, 5 Drawing Figures

DRILL JIG

BACKGROUND OF THE INVENTION

The present invention relates to portable angularly adjustable drill jigs and more particularly to portable angularly adjustable drill jigs adapted to guide drill bits for boring holes in a surface at any angle.

Drill presses and jigs arranged to provide a guide for drill bit attached to a power hand drill are well known. Typically, the known drill presses and jigs are placed in a fixed position on a surface. The drill bit is then inserted into a guide or when the drill bit is at a desired angular position relative to the surface, the power drill is operated, and the drill bit is moved against the surface, causing the drill bit to bore a hole at the desired angle in the surface. Examples of angularly adjustable drill presses and jigs are disclosed in U.S. Pat. No. 3,086,408 "Portable Angle Drill Jig" issued to Carl W. Donals on Apr. 23, 1963, and U.S. Pat. No. 3,534,639 "Portable Angularly Adjustable Drill Press" issued to Myron D. Treichler on Oct. 20, 1970. Unfortunately, once the known drill presses and jigs are fixed in position on the surface they do not lend themselves to easily and accurately guide a drill bit to bore a hole in a different plane. Accordingly, it is desired to arrange an apparatus to enable a user to bore holes at different angles and in more than one plane. Other important objects and advantageous features of the invention will be apparent from the following description and the accompanying drawings, wherein, for purposes of illustration only, a specific form of the invention is set forth in detail.

SUMMARY OF THE INVENTION

A drill jig comprises a frame, support member and guide means for guiding a drill bit. Means are provided for pivotally mounting opposite ends of the support member to the frame to allow the support member to pivotally move over an arcuate path in a first plane. Means are provided for pivotally mounting the guide means to the support member to allow the guide means to pivotally move over an arcuate path in a second plane substantially normal to the first plane.

DETAILED DESCRIPTION OF PREFERRED EMBODIMENTS

Figure 1:
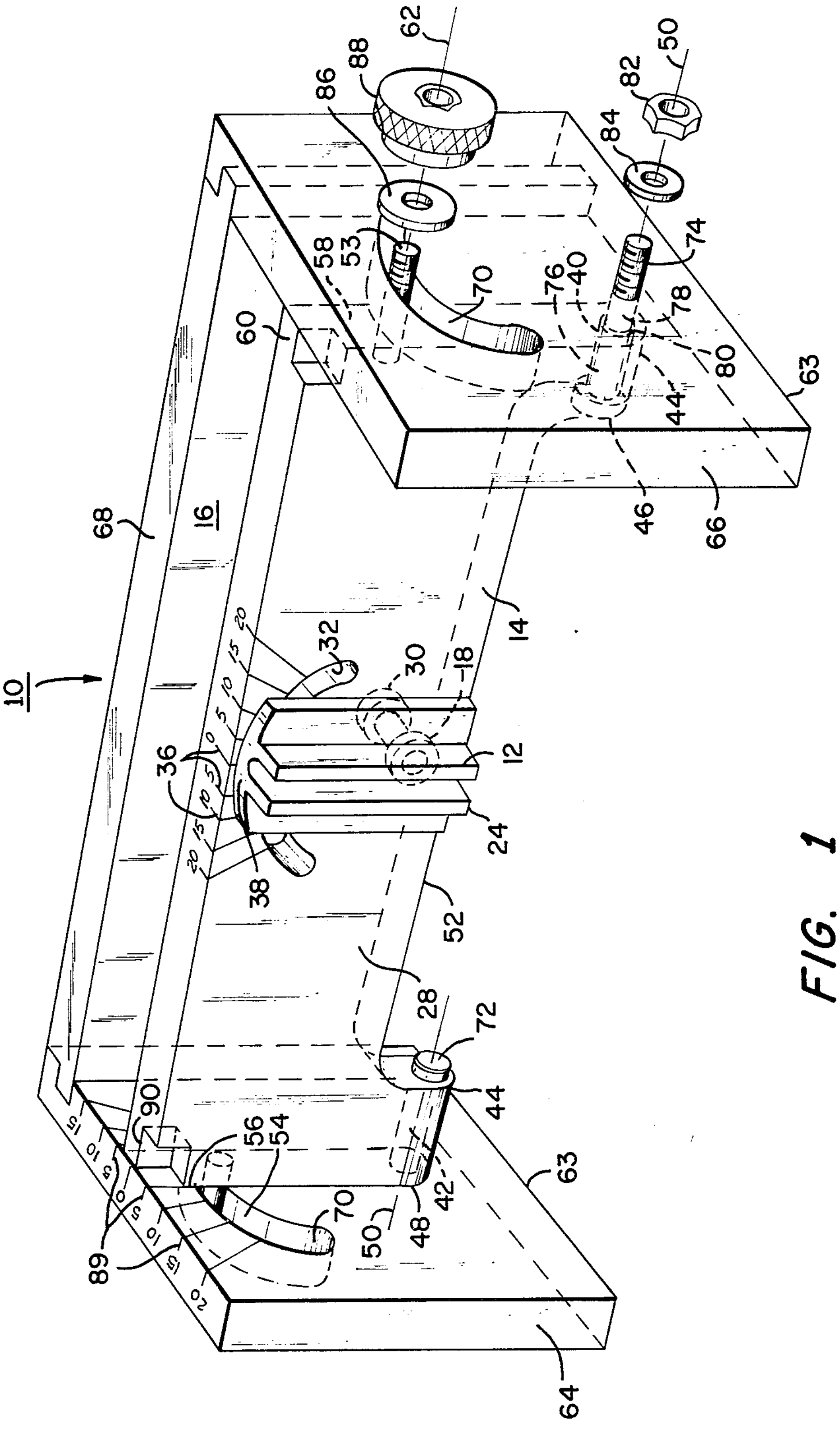
FIG. 1 is a perspective view of a drill jig arranged according to the invention.
Figure 2:
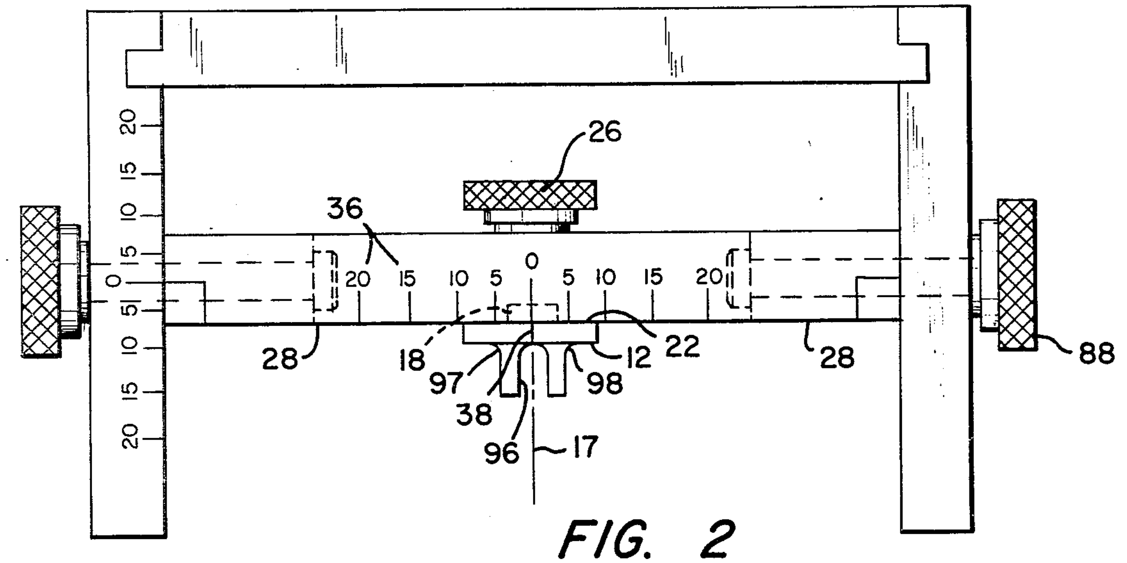
FIG. 2 is a top view of the drill jig.
Figure 5:
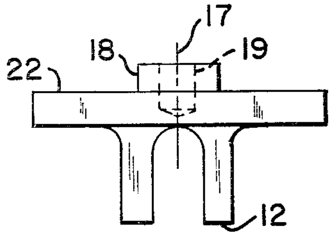
FIG. 5 is a top view of the drill bit guide.

Referring in detail to the drawing, wherein like numerals designate like parts throughout the several views, the illustrated device generally designated 10 comprises a grooved drill bit guide 12 pivotally mounted on a support member 14 which, in turn, is pivotally attached to a frame 16. Referring to FIGS. 1,2 and 5 there is shown details of the drill bit guide 12 including a cylindrically shaped boss 18 or raised surface and a bolt member 20 both projecting outwardly and substantially normal to the surface of a drill guide backface 22. The boss 18 is located near a bottom side 24 of the drill bit guide 12 and is adapted to provide a bearing surface for enhancing pivotal movement of the drill bit guide 12. The bolt member 20 and a cooperating nut 26 are intended to provide means for locking the drill bit guide 12 to the support member 14 in a preferred angular position relative to a work surface, not shown. The drill bit guide 12 is assembled to a support member front face 28 by inserting the boss 18 into a hole in the support member 14 suitably dimensioned to allow the drill guide 12 to pivotally move about the major axis of the boss 18. A screw 30 is then passed through the hole in the support member 14 and screwed into a threaded blind hole 19 in the boss 18. The depth of the blind hole 19 and the length of the screw 30 are selected so that the drill guide 12 may be coupled to the support member 14 yet free to pivotally move about the axis 17 of the boss 18.

The bolt member 20 is inserted into an arcuate shaped through hole 32 or groove provided in the support member 14. The nut 26 is twisted onto the threaded portion of the bolt 20 projecting from the back face 29 of the support member 14. It will be appreciated that when the nut 26 is loosened, the drill guide 12 is able to pivotally move over an arcuate path in a plane sustantially parallel to the plane of the support member front face 28. When the drill guide 12 is in a desired angular position in the plane of the support member front face 28, the nut 26 is tightened to lock the drill guide 12 in position. Indicia 36,38 may be appropriately inscribed in a top surface of the support member 14 and drill guide 12 to indicate relative angular position of the drill guide 12.

First 40 and second 42 coaxial through holes are provided near a bottom end 44 of first 46 and second 48 leg sections of the support member 14. The holes 40,42 have an axis 50 which is substantially parallel to a front edge 52 of the support member 14.

First 53 and second 54 coaxial bolt members project outwardly from opposite side edges 56,58 near a top end 60 of the support member 14. The axis 62 of the bolt members 53,54 is substantially parallel to the axis 50 of the coaxial holes in the support member 14.

The support member 14 is pivotally assembled to the frame 16 having first 64 and second 66 symmetrical end pieces suitably fastened to a back piece 68. The bolt members 53,54 projecting from the support member 14 are inserted into an arcuate-shaped through hole 70 provided in each of the end pieces 64,66. Smooth surfaces on the bolt members 53,54 bear against the smooth surface of the hole 70, and threaded sections of the bolt members 52,54 project through the hole 70.

Means for providing a pivot axis to enable the support member 14 and attached drill guide 12 to pivotally move over an arcuate path in a first plane substantially parallel to the plane of the end pieces 64,66 include bolt members 72,74 having a first portion 76 with a relatively smooth surface area abruptly joined to a second portion 78 with a reduced cross section and a threaded end. The length of the first portion 76, is slightly longer than the length of the leg sections 46,48 of the support member 14. The bolt members 72,74 are passed through the holes 40,42 in the leg sections 46,48 of the support member and into through holes near a bottom edge 63 of the end pieces 64,66. The first portion 76 of the bolt members 72,74 rest inside the leg sections 46,48. The second portion 78 of the bolt members 72,74 rest inside the holes in the end pieces 64,66 with the threaded bolt ends projecting beyond the surface of the end pieces. The junction 80 between the first 76 and second 78 portions of the bolt members 72,74 bear against an inside surface of the end pieces 64,66. Threaded nuts 82 are twisted onto the threaded bolt ends to secure the support member 14 to the frame 16. However, the support member 14 is free to pivotally move on the smooth first portion 76 of the bolt members 72,74 to a preferred angular position since the length of the first portion 76 is slightly longer than the length of the leg sections 46,48, a washer 84 being inserted inside a nut 82.

A washer 86 and threaded nut 88 is twisted onto the threaded ends of the bolts 53,54 to lock the support member 14 in the preferred angular position. Indicia 88,90 may be inscribed in a top surface of the end piece 64,66 and support member 14 to indicate relative angular position of the support member in the plane of the end piece 64,66.

Figure 3:
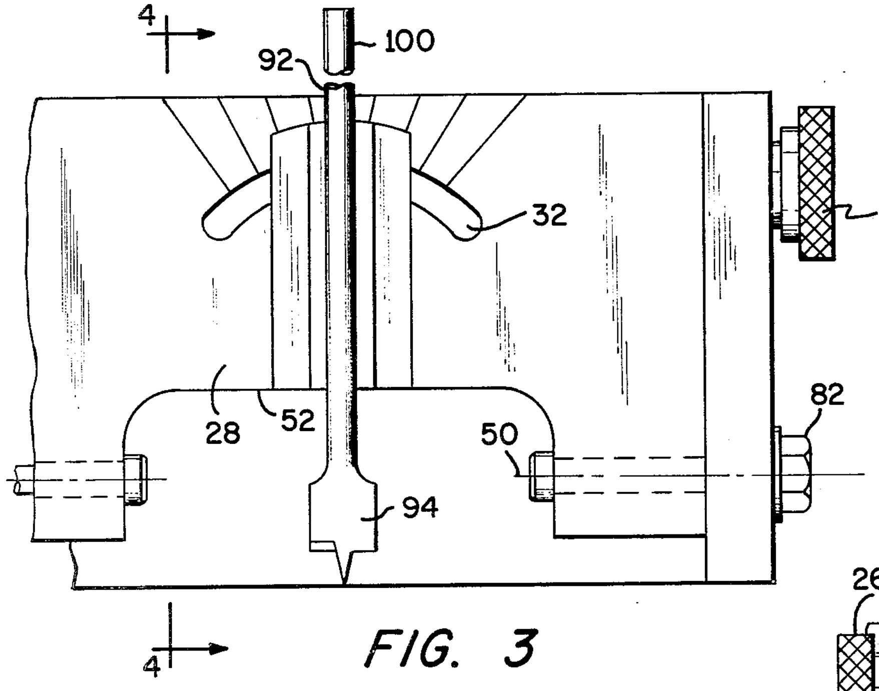
FIG. 3 is a front view, partially in section, of the drill jig shown guiding a drill bit.
Figure 4:
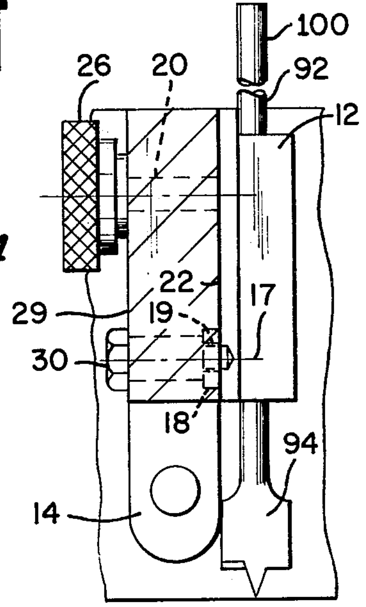
FIG. 4 is a side view taken along line 4—4 of FIG. 3 of a support member and attached drilling bit guide.

In operation, the drill jig 12 is clamped or attached to a bench, table or the work surface itself by screws, clamps, adhesives or other suitable attaching means. The locking nut 26 is loosened, and the drill guide 12 is pivotally moved about the pivot axis 17 in a plane substantially parallel to the front face 28 of the support member 14 to a first angular position, whereupon the locking nut 26 is tightened. If needed, the support member 14 may be pivotally moved about the pivot axis in a plane substantially parallel to the plane of the end pieces 64,66 to a second angular position, whereupon the locking nut 88 is tightened. The shank 92 of a drill bit 94, such as a spade bit, is inserted into a central groove 96 in the drill guide 12 as shown in FIGS. 3 and 4. The shank 92 of the drill bit 94 can also be held against either side groove 97,98. An end 100 of the drill bit 94 is held in the chuck of a power drill, not shown. The power drill is operated, and the drill bit 94 is pushed downwardly and against the drill bit guide groove 96 toward the work surface to bore a hole having an axis at a preferred angle relative to the work surface.

A preferred embodiment of the drill jig has been shown and described. Various other embodiments and modifications thereof will be apparent to those skilled in the art, and will fall within the scope of invention as defined in the following claims.

What is claimed is:

1. A drill jig for guiding drill bits for boring holes in a surface at any preselected compound angle comprising a frame having a pair of opposed substantially parallel end pieces substantially perpendicular to a back piece interconnecting said end pieces, at least said end pieces having bottom surfaces defining a bottom plane for seating upon said surface, a support member, means for pivotally mounting opposite ends of said support member to respective ones of said end pieces to allow said support member to pivotally move over an arcuate path about a first axis substantially parallel to said bottom plane, guide means for guiding a drill bit along a second axis, and means for pivotally mounting said guide means to said support member to allow said guide means to pivotally move over an arcuate path about a third axis substantially normal to said first axis and said second axis.

2. A drill jig according to claim 1 and further comprising means for locking said support member ends in a preferred position about said first axis corresponding to a first orthogonal component of said preselected compound angle.

3. A drill jig according to claim 2 wherein said locking means for said support member include bolt members projecting from said support member ends and extending through arcuate shaped through holes in said end pieces and nuts twisted onto said bolt members to lock said support member ends in said preferred position about said first axis.

4. A drill jig according to claim 1 and further comprising means for locking said drill guide in a preferred position about said second axis corresponding to a second orthogonal component of said preselected compound angle.

5. A drill jig according to claim 4 wherein said locking means for said drill guide include a bolt member projecting from said drill guide and extending through a arcuate shaped through hole in said support member and a nut twisted on said bolt member to lock said drill guide in said preferred position about said second axis.

6. A drill jig according to claim 1 wherein said means for pivotally mounting said guide means include a boss disposed within a hole in said support member and adapted to provide a bearing surface for enhancing said pivotal movement of said guide means.

* * * * *